US006998747B2

(12) United States Patent
Kujirai et al.

(10) Patent No.: US 6,998,747 B2
(45) Date of Patent: Feb. 14, 2006

(54) MULTIPLEX RESOLVER

(75) Inventors: Hiroyuki Kujirai, Tokyo (JP); Mutsumi Matsuura, Tokyo (JP); Taiichi Miya, Tokyo (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 10/911,473

(22) Filed: Aug. 5, 2004

(65) Prior Publication Data
US 2005/0162155 A1   Jul. 28, 2005

(30) Foreign Application Priority Data
Jan. 23, 2004 (JP) ............................. 2004-015623

(51) Int. Cl.
*H02K 17/44* (2006.01)
(52) U.S. Cl. .................... 310/112; 310/114; 318/661
(58) Field of Classification Search ........ 310/111–114, 310/256, 258, 259, 254; 341/112, 113; 318/661
See application file for complete search history.

(56) References Cited

U.S. PATENT DOCUMENTS

| 4,255,682 | A |   | 3/1981 | Toida et al. | |
|---|---|---|---|---|---|
| 4,604,575 | A | * | 8/1986 | Shimizu et al. | 324/207.18 |
| 4,743,786 | A | * | 5/1988 | Ichikawa et al. | 310/111 |
| 4,755,751 | A | * | 7/1988 | Ray | 324/207.18 |
| 5,032,750 | A | * | 7/1991 | Hayashi | 310/83 |
| 5,652,493 | A | * | 7/1997 | Hendershot, Jr. | 318/701 |
| 5,763,976 | A | * | 6/1998 | Huard | 310/168 |
| 6,624,541 | B1 | * | 9/2003 | Horng et al. | 310/45 |
| 6,809,456 | B1 | * | 10/2004 | Yun | 310/261 |

FOREIGN PATENT DOCUMENTS

| EP | 0009102 | 4/1980 |
|---|---|---|
| EP | 1473548 | 11/2004 |
| JP | 2000-018968 | 1/2000 |
| JP | 2000018968 | 1/2000 |

\* cited by examiner

*Primary Examiner*—Dang Le
(74) *Attorney, Agent, or Firm*—Bacon & Thomas, PLLC

(57) ABSTRACT

A multiplex resolver includes m resolver units disposed in tandem each comprising a rotor and a stator, where m is an integer not less than 2. The stator has a stator yoke, a plurality of stator magnetic poles projecting from the yoke, and excitation and output windings applied to the stator magnetic poles. The number of the stator magnetic poles corresponds to a shaft angle multiplier nX (n is an integer not less than 1) of the resolver. The rotor has n salient poles in accordance with the shaft angle multiplier nX. The respective stators of the resolver units are connected together such that the stator magnetic poles of the stator of one resolver unit do not overlap the stator magnetic poles of the stator of another resolver unit, as viewed in the axial direction.

6 Claims, 6 Drawing Sheets

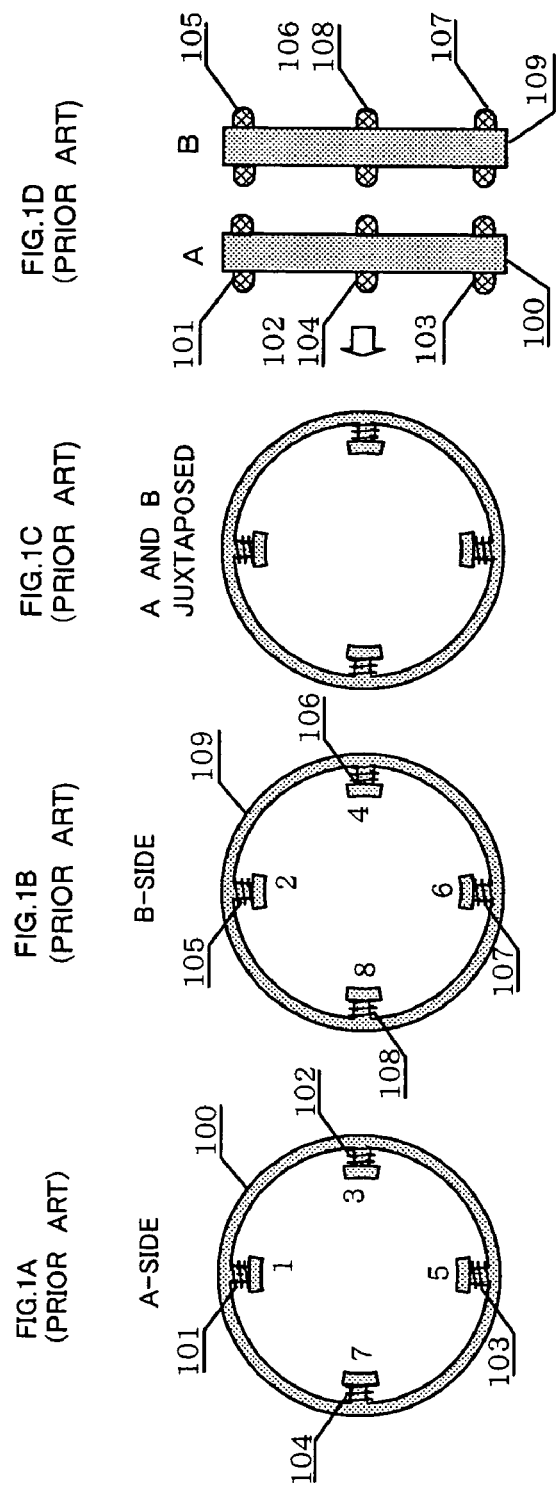

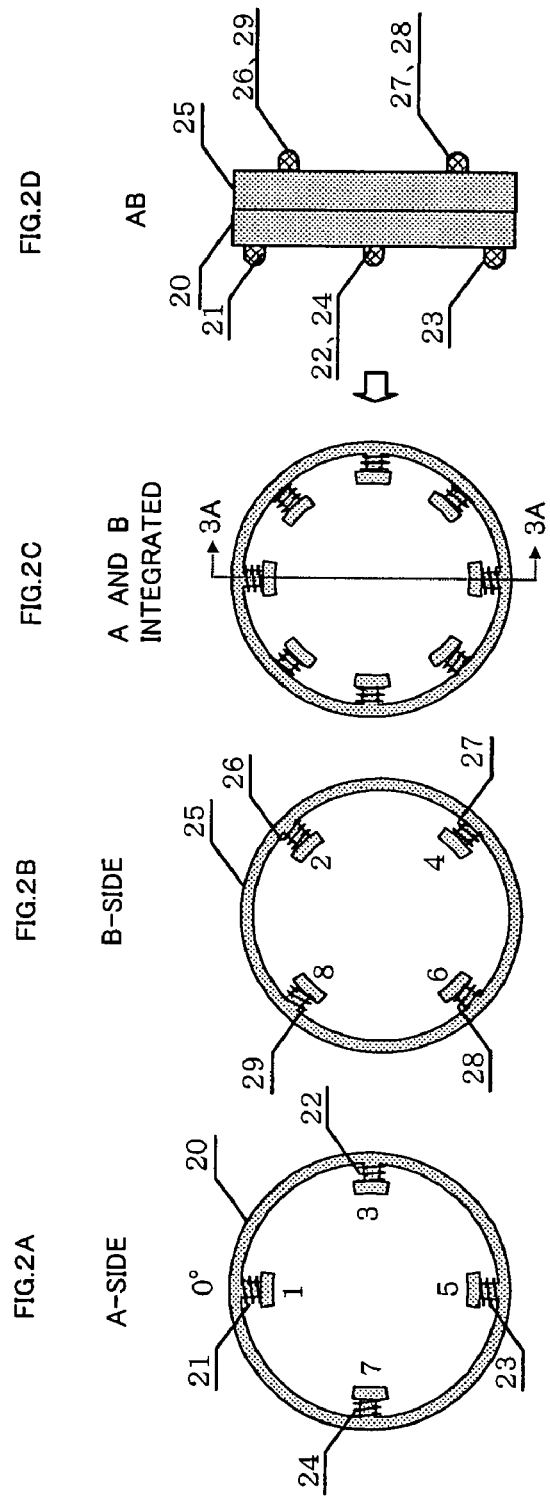

FIG.5
FIG.5B
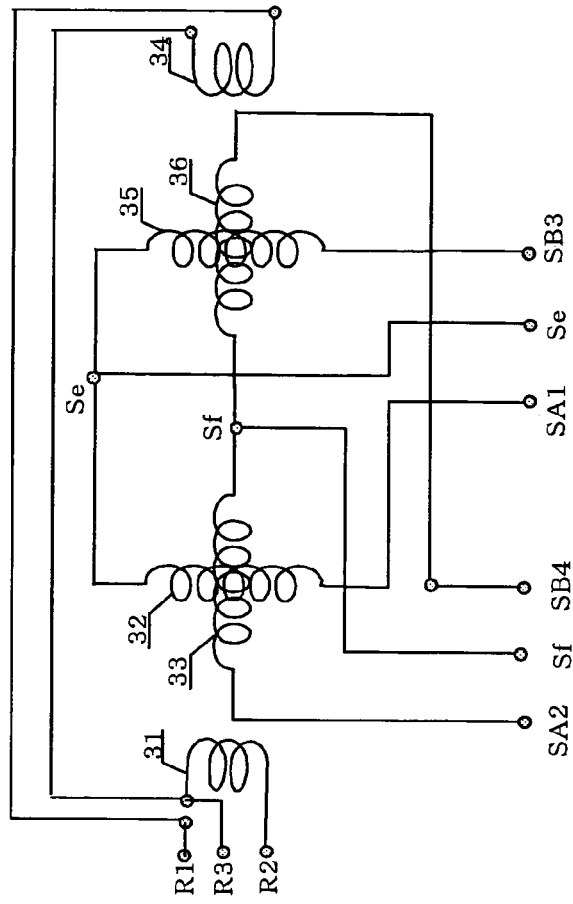
FIG.5A
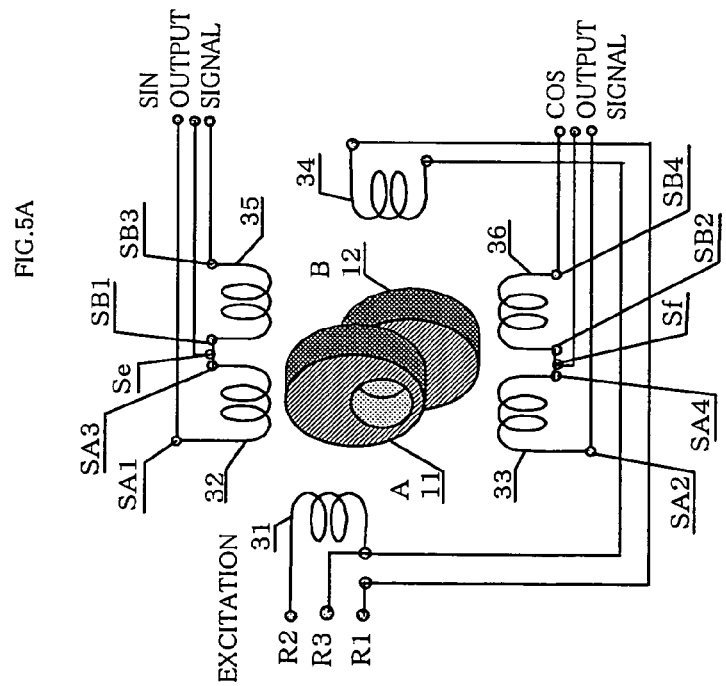

MULTIPLEX RESOLVER

BACKGROUND OF THE INVENTION

1. Field of the Invention

The present invention relates to a multiplex resolver which enables continuous monitoring of variation and imbalance of output signals, as well as reliable provision of output signals irrespective of occurrence of anomaly, such as wire breaking, in a portion of output windings and excitation windings. More particularly, the present invention relates to a multiplex resolver which includes m integrated resolver units (m is an integer not less than 2) and which has a reduced overall size as measured in the axial direction.

2. Related Art

Conventionally, in the case of a machine or apparatus in which a safety problem arises when output signals of a resolver vary or are lost, redundancy imparting means is provided in order to secure safety. Specifically, two identical resolvers are provided, and a plurality of signals output from the resolvers are monitored and compared so as to judge whether or not an anomaly has occurred. When one of the resolvers is broken and its output signals are lost, operation is continued on the basis of output signals of the other, normal resolver. Such redundancy imparting means is disclosed as a prior art technique in Japanese Patent Application Laid-Open No. 2000-18968.

The known redundancy imparting means is described as having the following drawback. Since windings wound on a stator project to the opposite sides of stator magnetic poles, a resultant resolver axially projects at least by an amount corresponding to the projecting amount of the windings, which makes it difficult to reduce, for miniaturization, the size as measured along the axial direction.

FIGS. 1A to 1D show a structure of a conventional resolver including two resolver units A and B. FIG. 1A shows the stator structure of the resolver unit A. Magnetic poles project from a stator yoke 100 at intervals of 90°, starting from a position of 12 o'clock serving as a reference position (0°). Windings 101, 102, 103, and 104 are wound clockwise around the respective magnetic poles. The windings consist of an excitation winding, and sin (sine) and cos (cosine) windings having a phase difference of 90° therebetween.

FIG. 1B shows the stator structure of the resolver unit B. Magnetic poles project from a stator yoke 109 at intervals of 90°, starting from a position of 12 o'clock serving as a reference position (0°). Windings 105, 106, 107, and 108 are wound clockwise around the respective magnetic poles.

When the resolver units A and B are juxtaposed, they provide an external shape of FIG. 1C when viewed from the front. When the resolver units A and B are viewed from the side, as shown in FIG. 1D, the windings project from the stator yokes 100 and 109. Therefore, the two resolver units are disposed with a separation corresponding to the projection amounts of the windings.

In order to solve this drawback, in the resolver disclosed in the patent publication, coils are wound on the stator in a divided manner to avoid overlapping of coil areas.

However, the stator of the resolver disclosed in the patent publication is a single ring-like stator having an overall annular shape, and does not have a commonly used structure in which stator magnetic poles project toward the center from an annular stator yoke. Therefore, the patent publication neither discloses nor suggests application of the above-described redundancy imparting means to ordinary stators.

Further, the publication neither discloses nor suggests the specific configuration of windings.

SUMMARY OF THE INVENTION

In light of the above-described problems, the object of the present invention is to provide a multiplex resolver which includes a plurality of resolver units for reliable operation, and in which the size of windings provided on stator magnetic poles as measured along the axial direction is reduced.

To achieve the above object, the present invention provides a multiplex resolver as follows.

The multiplex resolver according to the present invention includes m resolver units disposed in tandem each comprising a rotor and a stator, where m is an integer not less than 2. The stator has a stator yoke, a plurality of stator magnetic poles projecting from the yoke, and excitation and output windings applied to the stator magnetic poles. The number of the stator magnetic poles corresponds to a shaft angle multiplier nX (n is an integer not less than 1 and X is simply an indicator that the variable is a multiplier) of the resolver. The rotor has n salient poles in accordance with the shaft angle multiplier nX. The shaft angle multiplier nX is the ratio of the output electrical angle relative to the actual mechanical angle: for example if one complete cycle of variation of electrical signals is produced for one revolution of the rotor, the shaft angle multiplier nX equals 1.

The respective stators of the resolver units are connected together such that the stator magnetic poles of the stator of one resolver unit do not overlap, i.e., are circumferentially staggered from, the stator magnetic poles of the stator of another resolver unit, as viewed in the axial direction.

The stator magnetic pole structures, output winding structures, and rotor structures (shapes) of the resolver units are determined such that the output windings of one resolver unit and those of another resolver unit output substantially identical output signals.

In one embodiment, the excitation winding and output winding of one resolver unit are connected in parallel to those of another resolver unit.

In another embodiment, the excitation winding and output winding of one resolver unit are connected in series to those of another resolver unit to form series circuits including the excitation windings and the output windings, respectively; output terminals are provided at opposite ends of the series circuits; and the output terminals are provided for the respective windings of each resolver unit.

In still another embodiment, the excitation winding and output winding of each resolver unit are separated from each other; and output terminals are provided at opposite ends of each of the excitation winding and the output winding.

The multiplex resolver of the present invention may be configured such that the value of n is 1, and the rotor and stator of each resolver unit have configurations for realizing a shaft angle multiplier of 1X.

The multiplex resolver of the present invention may be configured such that the value of m is 2.

In the multiplex resolver of the present invention, since the stator windings projecting from one stator yoke do not overlap the stator windings projecting from the adjacent stator yoke, the axial size of the resolver can be reduced. Further, through properly pairing of the output terminals of the output windings, there can be output output signals which can be compared with each other in an ordinary state, an output signal involving no error stemming from eccentricity, an averaged output signal, etc. Moreover, even when breakage of wire or the like occurs, the output signal can be secured.

BRIEF DESCRIPTION OF THE DRAWINGS

Various other objects, features and many of the attendant advantages of the present invention will be readily appreciated as the same becomes better understood with reference to the following detailed description of the preferred embodiments when considered in connection with the accompanying drawings, in which:

FIGS. 1A to 1D show a stator structure of a conventional resolver;

FIGS. 2A to 2D show a stator structure of a duplex resolver according to the present invention;

FIGS. 5A and 5B are diagrams showing a second example of winding specifications of the multiplex resolver according to the present invention.

DESCRIPTION OF PREFERRED EMBODIMENTS

Embodiments of the present invention will be described while a variable reluctance (VR) resolver is taken as an example.

A variable reluctance resolver according to the present invention includes m resolver units disposed in tandem, each comprising a rotor and a stator, where m is an integer not less than 2. The stator has a stator yoke, a plurality of stator magnetic poles projecting from the yoke, and excitation and output windings applied to the stator magnetic poles. The number of the stator magnetic poles corresponds to a shaft angle multiplier nX (n is an integer not less than 1) of the resolver. The rotor has n salient poles in accordance with the shaft angle multiplier nX. The respective stators of the resolver units are connected together such that the stator magnetic poles of the stator of one resolver unit do not overlap the stator magnetic poles of the stator of another resolver unit, as viewed in the axial direction. The stator magnetic pole structures, stator winding structures, and rotor structures of the resolver units are determined such that the output windings of one resolver unit and those of another resolver unit output substantially identical output signals.

The output of the multiplex resolver described in the following embodiments is fed to a controller (not shown). On the basis of the output (i.e., excitation signals, sin output signals, and cos output signals), the controller constantly monitors output variation and the like through comparison of the output signals. When a wire breakage is detected, the controller uses the normal set of output signals while disregarding the anomalous set of output signals. This controller is formed of means having a computation function, such as a microcomputer.

Figure 3A:
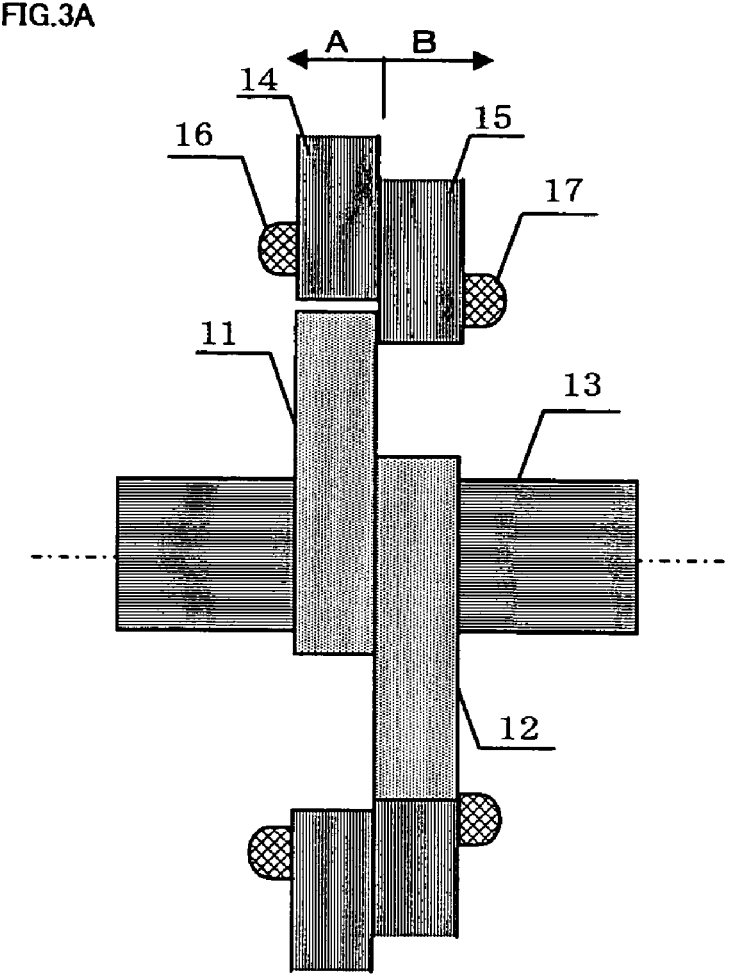
FIGS. 3A and 3B are views showing the duplex resolver according to the present invention.
Figure 3B:
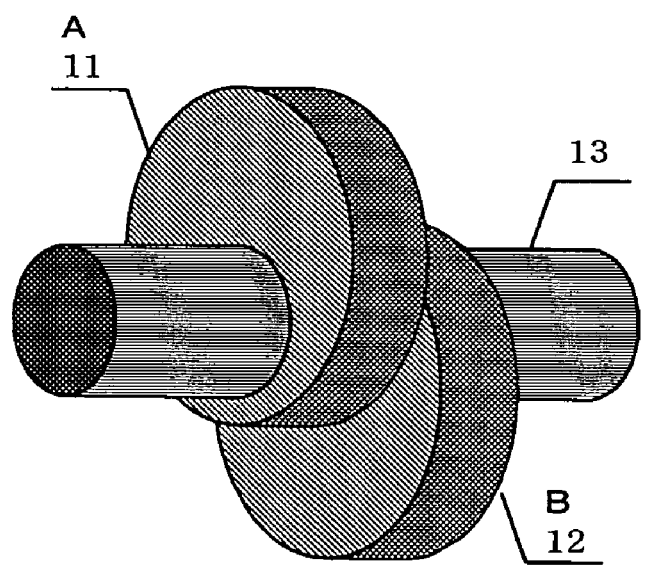

First Embodiment:

FIGS. 3A and 3B show a structure of a duplex resolver according to the present invention. The duplex resolver comprises a stator assembly shown in FIGS. 2A to 2D and including two integrated stators, and a rotor assembly shown in FIG. 3B and including two rotors. Notably, of magnetic poles of the stators, only magnetic poles having windings are shown. FIG. 3A is a cross sectional view taken along a line 3A—3A of FIG. 2C. FIG. 3B is a perspective view of the rotor assembly. In FIG. 3A, each magnetic pole 15 having a winding 17 is illustrated with a shift with respect to each magnetic pole 14 having a winding 16, because, as shown in FIG. 2C, an angular shift (phase difference) of 45° is provided between these magnetic poles.

The duplex resolver of the present invention is realized in the form of an assembly of two resolver units. Each resolver unit basically includes a single rotor, a single stator having a plurality of stator magnetic poles projecting therefrom, an excitation winding, a sin winding, and a cos winding.

In the duplex resolver, rotors 11 and 12 are connected together and attached to a shaft 13; and a stator A including the stator magnetic poles 14 having the windings 16 and a stator B including the stator magnetic poles 15 having the windings 17 are connected such that the windings 16 and the windings 17 do not overlap each other, i.e., are circumferentially staggered from each other, as viewed in the axial direction of the shaft 13. In the first embodiment, the respective portions of each resolver unit are configured so as to satisfy the relation of the shaft angle multiplier of 1X. The zero point of the salient pole of each rotor is determined on the basis of various factors such as the number and positions of magnetic poles of the corresponding stator, and selection of magnetic poles on which windings are provided. Therefore, the angle between the zero points of the two rotors can be set to an arbitrary angle, such as 90° or 180° through selection of these factors.

Rotor Assembly

The rotor assembly is constituted such that m rotors 11, 12 (m is an arbitrary integer, and is 2 in the present embodiment) are connected together along the direction of the shaft 13. The rotors 11 and 12 have (a) the same shape and number of salient poles so as to provide the same output, or (b) different shapes and numbers of salient poles so as to provide outputs that can be compared with each other.

In the case (a) in which the rotors 11 and 12 are rendered identical in terms of the shape and number of salient poles, the rotors 11 and 12 are configured to have the same shape and number of salient poles in accordance with a required shaft angle multiplier; e.g., 1X. Respective windings of the stators are arranged in accordance with any one of the specifications of second through fourth embodiments, as will be described later.

In the case (b) in which the rotors 11 and 12 are rendered different from each other in terms of the shape and number of salient poles, the required shaft angle multiplier is changed between the rotors 11 and 12; and the stators are configured such that the stators have the same number of stator magnetic poles having output windings per arbitrary electrical angle unit, and the output signals from the output windings assume the same values at each electrical angular position. This enables the windings of the stator magnetic poles to be arranged in accordance with the specifications of the fourth embodiment, as will be described later.

FIGS. 3A and 3B show a rotor assembly formed of two rotors which are connected together by means of, for example, dowel members (not shown) each consisting of a projection and a depression provided on front and back surfaces, respectively, of the rotors.

Since the rotors are connected together by means of dowel members provided on the rotors without any gap formed therebetween, mutual positioning is facilitated, and the axial size can be reduced.

Stator Assembly

FIGS. 2A to 2D show the structure of a stator assembly, which is used in combination with the rotor assembly including two rotors shown in FIGS. 3A to 3B.

FIG. 2A shows the first stator A, in which magnetic poles 1, 3, 5, and 7 project from an annular stator yoke 20 at intervals of 90°, starting from 0°, which is a position of 12 o'clock serving as a reference position. Windings 21, 22, 23, and 24 are wound around the respective magnetic poles in predetermined winding directions, in a predetermined sequence, and in the predetermined number of turns.

FIG. 2B shows the second stator B, in which magnetic poles 2, 4, 6, and 8 project from an annular stator yoke 25 at intervals of 90°, starting from 45° with the position of 12 o'clock serving as a reference position (0°). Windings 26, 27, 28, and 29 are wound around the respective magnetic poles in predetermined winding directions, in a predetermined sequence, and in the predetermined number of turns.

Subsequently, as shown in FIG. 2C, the stators A and B are assembled and united in such a manner that the magnetic poles of the stators are arranged at equal intervals; i.e., intervals of 45°.

As show in FIG. 2D, the windings wound around the respective magnetic poles laterally project from the stator poles 20 and 25, respectively, in the axial direction. However, by virtue of the arrangement as shown in FIG. 2C, in which the magnetic poles of one stator are located between the magnetic poles of the other stator, axially projecting portions of the windings on the stator poles protrude into the open center portions of the adjoining stator yokes preventing interference between the windings, which would otherwise occur upon integration of the stator yokes 20 and 25, and the axial size of the resolver can be reduced. Moreover, since the magnetic poles are disposed at equally spaced positions, change in reluctance between the magnetic poles and the rotors can be detected more accurately as compared with the case where the magnetic poles of the two stators are disposed in an overlap condition.

Second Embodiment:

Next, a first example of winding specifications in the multiplex resolver of the present invention will be described, while a duplex resolver is taken as an example.

Figure 4:
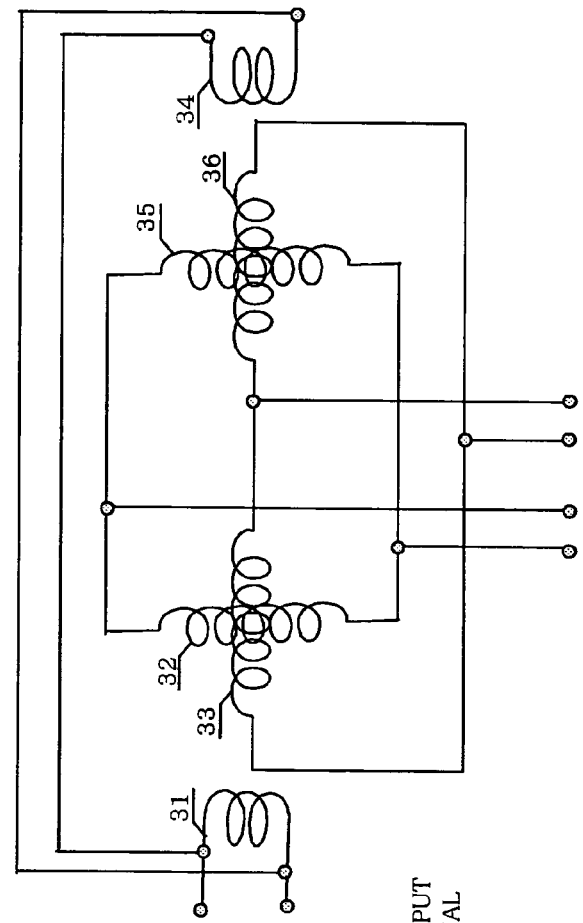
FIGS. 4A and 4B are diagrams showing a first example of winding specifications of a multiplex resolver according to the present invention.

FIGS. 4A and 4B are wiring diagrams showing the first example of winding specifications in the multiplex resolver of the present invention.

FIG. 4A is a schematic wiring diagram in which the rotors are illustrated schematically. FIG. 4B is a wiring diagram. In FIG. 4A, a rotor assembly including the rotor (A) 11 and the rotor (B) 12 is fabricated as follows. The rotor (A) 11 and the rotor (B) 12, which have the same shaft angle multiplier (1X in this case), are connected with an arbitrary angle (mechanical angle) difference, such as 45°, 90°, or 180°, therebetween, while conditions in relation to the stators, such as the number and positions of magnetic poles of the respective stators, and selection of magnetic poles to which windings are applied, are properly selected. In the example of FIGS. 4A and 4B, three windings (an excitation winding, a sin winding, and a cos winding) are provided for each rotor.

An excitation winding (RA) 31, a sin winding (SA) 32, and a cos winding (CA) 33 are provided for the rotor (A) 11.

An excitation winding (RB) 34, a sin winding (SB) 35, and a cos winding (CB) 36 are provided for the rotor (B) 12.

The respective windings are provided on the plurality of magnetic poles of each stator yoke with a predetermined relation.

The excitation winding (RA) 31 for the rotor (A) 11 and the excitation winding (RB) 34 for the rotor (B) 12 are connected in parallel; and an excitation signal is applied to these windings.

The cos winding (CA) 33 for the rotor (A) 11 and the cos winding (CB) 36 for the rotor (B) 12 are connected in parallel, and output a cos output signal upon rotation of the rotors.

The sin winding (SA) 32 for the rotor (A) 11 and the sin winding (SB) 35 for the rotor (B) 12 are connected in parallel, and output a sin output signal upon rotation of the rotors.

In the present embodiment, the excitation winding, cos winding, and sin winding of one resolver unit and those of the other resolver are connected in parallel. Therefore, in an ordinary state, output signals are output from both the winding groups. When a wire breakage occurs in one winding group, output signals can be obtained from the other winding group.

Third Embodiment:

Next, a second example of winding specifications in the multiplex resolver of the present invention will be described, while a duplex resolver is taken as an example.

FIGS. 5A and 5B are wiring diagrams showing the second example of winding specifications in the multiplex resolver of the present invention.

FIG. 5A is a schematic wiring diagram in which the rotors are illustrated schematically. FIG. 5B is a wiring diagram. In FIG. 5A, a rotor assembly is fabricated as follows. The rotor (A) 11 and the rotor (B) 12, which have the same shaft angle multiplier (1X in this case), are connected with an arbitrary angle (mechanical angle) difference, such as 45°, 90°, or 180°, therebetween, while conditions in relation to the stators, such as the number and positions of magnetic poles of the respective stators, and selection of magnetic poles to which windings are applied, are properly selected. In the example of FIGS. 5A and 5B, three windings (an excitation winding, a sin winding, and a cos winding) are provided for each rotor.

The excitation winding (RA) 31, the sin winding (SA) 32, and the cos winding (CA) 33 are provided for the rotor (A) 11.

The excitation winding (RB) 34, the sin winding (SB) 35, and the cos winding (CB) 36 are provided for the rotor (B) 12.

The respective windings are provided on the plurality of magnetic poles of each stator yoke with a predetermined relation.

Excitation Windings

Opposite ends of the excitation winding (RA) 31 are connected to terminals R2 and R3, respectively; and opposite ends of the excitation winding (RB) 34 are connected to the terminal R3 and a terminal R1, respectively. Accordingly, the terminal R3 is commonly connected to both the excitation winding (RA) 31 and the excitation winding (RB) 34.

Excitation signal voltages are applied to the terminals R1, R2, and R3, which are combined properly.

For example, with the terminal R3 being used as a common ground, the excitation signal voltages are applied between the terminals R2 and R3 of the excitation winding (RA) 31 and between the terminals R1 and R3 of the excitation winding (RB) 34, respectively. Alternatively, with the terminal R1 being used as a common ground, the excitation signal voltages are applied between the terminal R1 and R3 of the excitation winding (RB) 34 and between the terminals R2 and R1 connected to the opposite ends of the serially connected excitation windings (RA) 31 and (RB) 34. Alternatively, with the terminal R2 being used as a common ground, the excitation signal voltages are applied between the terminals R2 and R3 of the excitation winding (RA) 31 and between the terminals R2 and R1 connected to the opposite ends of the serially connected excitation windings (RA) 31 and (RB) 34.

When the excitation windings are connected in series as described above for averaging, variations in the excitation signals stemming from the center deviation or eccentricity can be averaged. When wire breakage occurs in one of the windings, determination as to whether the output is present is performed. When the output is not present, a winding which is not connected in series is used.

Sin Windings

Opposite ends of the sin winding (SA) 32 are connected to terminals SA1 and SA3, respectively; and opposite ends of the sin winding (SB) 35 are connected to terminals SB3 and SB1, respectively. The terminal SA3 and the terminal SB1 are connected to an intermediate terminal Se. Thus, the terminal Se is commonly connected to the sin winding (SA) 32 and the sin winding (SB) 35. Sin output signals are extracted from the terminals SA1, Se, and SB3, which are combined properly.

For example, with the terminal Se being used as a common ground, the sin output signals are extracted from the voltage between the terminal Se and the terminal SA1 of the sin winding (SA) 32, and from the voltage between the terminal Se and the terminal SB3 of the sin winding (SB) 35. Alternatively, with the terminal SA1 being used as a common ground, the sin output signals are extracted from the voltage between the terminal Se and the terminal SA1 of the sin winding (SA) 32, and from the voltage between the terminals SA1 and SB3 connected to the opposite ends of the serially connected sin winding (SA) 32 and sin winding (SB) 35. Alternatively, with the terminal SB3 being used as a common ground, the sin output signals are extracted from the voltage between the terminal Se and the terminal SB3 of the sin winding (SB) 35, and from the voltage between the terminals SA1 and SB3 connected to the opposite ends of the serially connected sin winding (SA) 32 and sin winding (SB) 35.

When the sin winding (SA) 32 and the sin winding (SB) 35 are connected in series as described above for averaging, variations in the sin output signals stemming from the center deviation or eccentricity can be averaged. In ordinary state, output signals which can be compared with each other can be obtained. When wire breakage occurs in one of the windings, determination as to whether the output is present is performed. When the output is not present, a sin winding which is not connected in series is used.

Cos Windings

Opposite ends of the cos winding (CA) 33 are connected to terminals SA2 and SA4, respectively; and opposite ends of the cos winding (CB) 36 are connected to terminals SB2 and SB4, respectively. The terminal SA4 and the terminal SB2 are connected to an intermediate terminal Sf. Thus, the terminal Sf is commonly connected to the cos winding (CA) 33 and the cos winding (CB) 36. Cos output signals are extracted from the terminals SA2, Sf, and SB4, which are combined properly.

For example, with the terminal Sf being used as a common ground, the cos output signals are extracted from the voltage between the terminal Sf and the terminal SA2 of the cos winding (CA) 33, and from the voltage between the terminal Sf and the terminal SB4 of the cos winding (CB) 36. Alternatively, with the terminal SA2 being used as a common ground, the cos output signals are extracted from the voltage between the terminal Sf and the terminal SA2 of the cos winding (CA) 33, and from the voltage between the terminals SA2 and SB4 connected to the opposite ends of the serially connected cos winding (CA) 33 and cos winding (CB) 36. Alternatively, with the terminal SB4 being used as a common ground, the cos output signals are extracted from the voltage between the terminal Sf and the terminal SB4 of the cos winding (CB) 36, and from the voltage between the terminals SA2 and SB4 connected to the opposite ends of the serially connected cos winding (CA) 33 and cos winding (CB) 36.

When the cos winding (CA) 33 and the cos winding (CB) 36 are connected in series as described above for averaging, variations in the cos output signals stemming from the center deviation or eccentricity can be averaged. In an ordinary state, output signals which can be compared with each other can be obtained. When wire breakage occurs in one of the windings, determination as to whether the output is present is performed. When the output is not present, a cos winding which is not connected in series is used.

In the present embodiment, terminals are provided so as to enable the cos winding and sin winding of each winding group (each revolver unit) to individually output output signals and to output the sum of the output signals. In an ordinary state, output signals are output from one of the winding groups. When wire breakage occurs in one of the winding groups, output signals can be extracted from the other winding group.

Fourth Embodiment:

Next, a third example of winding specifications in the multiplex resolver of the present invention will be described, while a duplex resolver is taken as an example.

Figure 6:
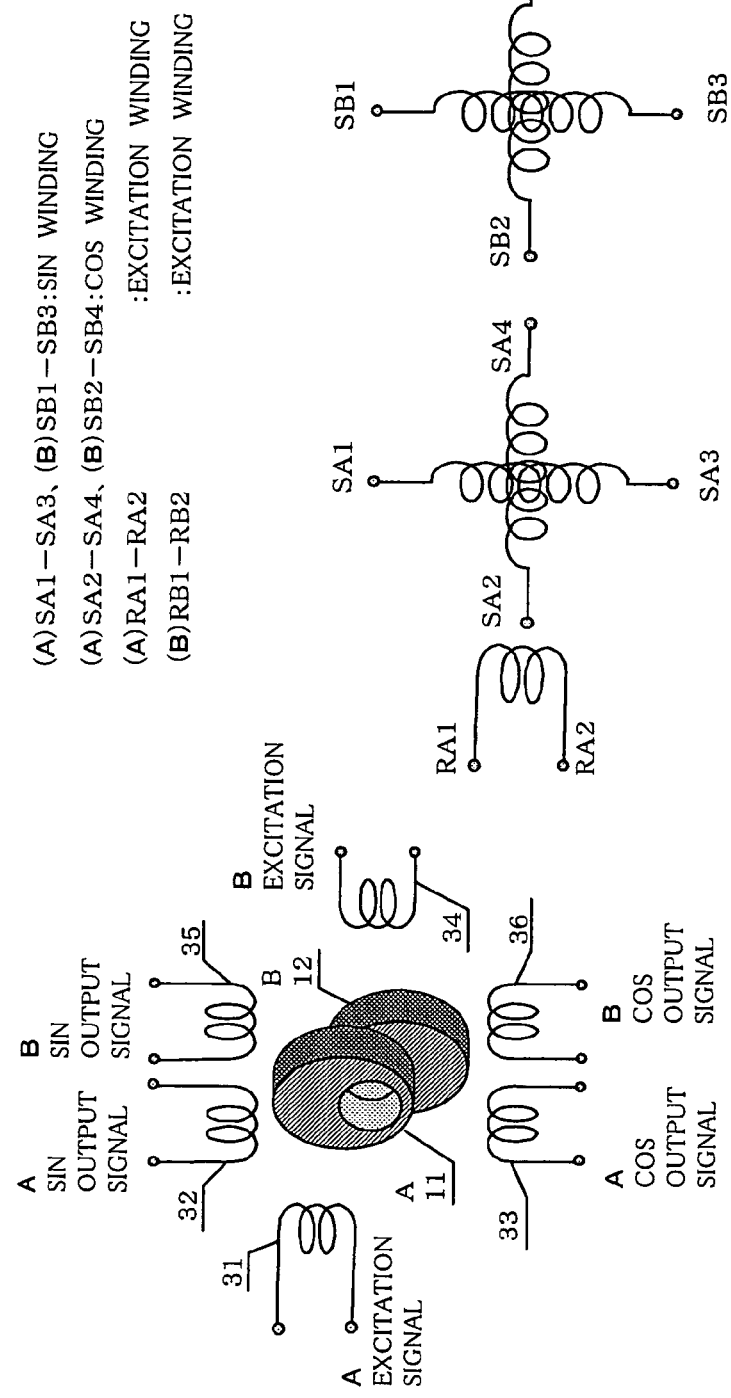
FIGS. 6A and 6B are diagrams showing a third example of winding specifications of the multiplex resolver according to the present invention.

FIGS. 6A and 6B are wiring diagrams showing the third example of winding specifications in the multiplex resolver of the present invention.

FIG. 6A is a schematic wiring diagram in which the rotors are illustrated schematically. FIG. 6B is a wiring diagram. In FIG. 6A, a rotor assembly is fabricated as follows. The rotor (A) 11 and the rotor (B) 12, which have the same shaft angle multiplier or different shaft angle multipliers, are connected with an arbitrary angle (mechanical angle) difference of 180° therebetween. In the illustrated example, three windings (an excitation winding, a sin winding, and a cos winding) are provided for each rotor.

The excitation winding (RA) 31, the sin winding (SA) 32, and the cos winding (CA) 33 are provided for the rotor (A) 11.

The excitation winding (RB) 34, the sin winding (SB) 35, and the cos winding (CB) 36 are provided for the rotor (B) 12.

All the windings are present independently without any serial or parallel connection. The respective windings are provided on the plurality of magnetic poles of each stator yoke with a predetermined relation.

Excitation Windings

The excitation winding (RA) 31 is successively wound around a plurality of magnetic poles of the corresponding stator yoke which are determined in accordance with the number and shapes of salient poles of the rotor (A) 11.

Similarly, the excitation winding (RB) 34 is successively wound around a plurality of magnetic poles of the corresponding stator yoke which are determined in accordance with the number and shapes of salient poles of the rotor (B) 12.

Sin Windings

The sin winding (SA) 32 is successively wound around a plurality of magnetic poles of the corresponding stator yoke which are determined in accordance with the number and shapes of salient poles of the rotor (A) 11 in such a manner that a phase difference of 90° is provided between the sin winding and the cos winding. Similarly, the sin winding (SB) 35 is successively wound around a plurality of magnetic poles of the corresponding stator yoke which are determined in accordance with the number and shapes of salient poles of the rotor (B) 12 in such a manner that a phase difference of 90° is provided between the sin winding and the cos winding.

Cos Windings

The cos winding (CA) 33 is successively wound around a plurality of magnetic poles of the corresponding stator yoke which are determined in accordance with the number and shapes of salient poles of the rotor (A) 11 in such a manner that a phase difference of 90° is provided between the cos winding and the sin winding. Similarly, the cos winding (CB) 36 is successively wound around a plurality of magnetic poles of the corresponding stator yoke which are determined in accordance with the number and shapes of salient poles of the rotor (B) 12 in such a manner that a phase difference of 90° is provided between the cos winding and the sin winding.

The Case Where Both the Rotors Have the Same Shaft Angle Multiplier

When both the rotors are configured to have the same shaft angle multiplier, the rotors are configured to have the same number and shape of salient poles, such that the input and output signals of the windings of one resolver unit become the same as those of the windings of the other resolver unit.

The Case Where the Rotors Have Different Shaft Angle Multipliers

Basically, a duplex VR resolver is configured through combining a VR resolver having a shaft angle multiplier of 1X, and a VR resolver having a shaft angle multiplier of nX (n is an integer not less than 1).

When the number of output windings provided on respective stator magnetic poles of the VR resolver whose shaft angle multiplier is 1X (in this case, the number is equal to the number of magnetic poles) and its relation between the outputs and the positions of the output windings (in the rotational direction of the rotor) are the same as the number of output windings provided on stator magnetic poles, in an angular zone corresponding to the shaft angle multiplier 1X, of the VR resolver whose shaft angle multiplier is nX (in this case, the number is equal to the number of magnetic poles) and its relation between the outputs and the positions of the output windings, this relation holds in all the angular zones corresponding to the shaft angle multiplier nX. When this relation is applied to a 1X resolver unit and an nX resolver unit, in an ordinary state, these resolver units can output output signals which can be compared with each other. When wire breakage occurs in one of the resolver units, outputs can be secured in order to secure safety, although the resolver units differ in shaft angle multiplier.

The above-described embodiments exemplify a duplex resolver. However, the present invention can be similarly applied to a multiplex resolver having three or more integrated resolver units.

The machine equipped with the resolver is controlled by means of the controller to perform a predetermined operation, in both the case where the two rotors have the same shaft angle multiplier and the case where the two rotors have different shaft angle multipliers.

Obviously, numerous modifications and variations of the present invention are possible in light of the above teachings. It is therefore to be understood that within the scope of the appended claims, the present invention may be practiced otherwise than as specifically described herein.

What is claimed is:

1. A multiplex resolver comprising:
   m resolver units disposed in tandem each comprising a rotor and a stator, where m is an integer not less than 2,
   each stator having a stator yoke, a plurality of stator magnetic poles projecting from the yoke, and excitation and output windings being wound around the stator magnetic poles,
   each rotor having n salient poles wherein n is an integer of not less than 1, and
   the stator yokes of the resolver units being connected together in juxtaposition such that the stator magnetic poles and windings of the stator of one resolver unit are circumferentially staggered from the stator magnetic poles and windings of the stator of another resolver unit, as viewed in the axial direction,
   wherein stator magnetic pole structures, output winding structures, and rotor structures of the resolver units are determined such that the output windings of one resolver unit and those of another resolver unit output substantially identical output signals, and
   wherein the stator yokes are annular yokes having a common axis, the pluralities of stator magnetic poles project radially inward from the yokes, and projecting portions of the windings on the stator magnetic poles protrude into slots formed between the stator magnetic poles of adjoining annular yokes.

2. A multiplex resolver according to claim 1, wherein the excitation winding and output winding of one resolver unit are connected in parallel to those of another resolver unit.

3. A multiplex resolver according to claim 1, wherein the excitation winding and output winding of one resolver unit are connected in series to those of another resolver unit to form series circuits including the excitation windings and the output windings, respectively; output terminals are provided at opposite ends of the series circuits; and the output terminals are provided for the respective windings of each resolver unit.

4. A multiplex resolver according to claim 1, wherein the excitation winding and output winding of each resolver unit are separated from each other; and output terminals are provided at opposite ends of each of the excitation winding and the output winding.

5. A multiplex resolver according to claim 1, wherein the value of n is 1, and the rotor and stator of each resolver unit have configurations for realizing a shaft angle multiplier of 1.

6. A multiplex resolver according to claim 1, wherein the value of m is 2.

* * * * *